United States Patent

[11] 3,612,892

| [72] | Inventors | Robert Nobile<br>Tarreyton, N.Y.;<br>Joseph B. Gag, Stamford, Conn. |
|---|---|---|
| [21] | Appl. No. | 59,447 |
| [22] | Filed | July 30, 1970 |
| [45] | Patented | Oct. 12, 1971 |
| [73] | Assignee | Textron, Inc.<br>Providence, R.I. |

[54] MOTOR GENERATOR WITH AUTOMATIC SPEED AND IDLING CONTROL
8 Claims, 5 Drawing Figs.

[52] U.S. Cl. .................................................. 290/40, 290/1
[51] Int. Cl. ...................................................... H02p 9/04
[50] Field of Search ........................................... 290/40, 40 A, 40 B, 1; 322/33, 14

[56] References Cited
UNITED STATES PATENTS
3,070,705  12/1962  Forss et al..................... 290/40
3,192,394  6/1965  Teter........................... 290/40
3,513,325  5/1970  Tharp.......................... 290/40

*Primary Examiner*—G. R. Simmons
*Attorneys*—Robert E. Burns and Emmanuel J. Lobato ABSTRACT: An automatic control for an internal combustion engine driving an alternating current electric generator supplying a variable and intermittent load comprises a speed responsive governor controlling the throttle of the engine to maintain it at a constant operating speed as long as there is load on the generator regardless of the amount of load and an automatic override which reduces the engine speed to a selected idling speed when there is no load on the generator. The override is effected by an electromagnetic device controlled by a circuit comprising a current transformer having a primary winding in series with the generator load and a silicon-controlled rectifier controlled by the rectifier output of the transformer secondary and connected to switch the electromagnetic device on or off.

3,612,892

MOTOR GENERATOR WITH AUTOMATIC SPEED AND IDLING CONTROL

The invention relates to a motor generator set comprising an electric generator driven by an internal combustion engine and particularly to means for controlling the engine speed.

Motor generator sets are widely used to supply power for a variety of loads as, for example, the lights and electric tools on a construction site. The load on the generator is usually variable, depending for example on how many lights or tools are being used at any one time, and is also intermittent since there may be times when no lights and no appliances are being used. In order to provide a constant voltage and, in the case of an alternating current generator, a constant frequency, it is known to control the engine driving the generator by means of a speed responsive governor so as to maintain a relatively constant engine speed regardless of load. However, during periods when there is no load on the generator it is desirable to run the engine at a lower speed in order to save fuel, reduce the noise level and increase the life of the equipment.

It is an object of the present invention to provide an automatic control for an internal combustion engine driving an alternating current electric generator supplying a variable and intermittent load so as to maintain the engine speed at a relatively constant operating value as long as there is load on the generator regardless of the amount of load and automatically reduce the speed of the engine to a selected idling speed during periods when there is no load on the generator, the engine being automatically accelerated to operating speed as soon as any load is applied to the generator.

In accordance with the invention, engine speed is normally maintained at a selected operating value by a speed responsive governor, but means is provided for overriding the governor to operate the engine at a selected idling speed during periods when there is no load on the generator. When the generator is again subjected to load, the overriding means is deactivated so that control of the engine by the speed responsive governor is restored.

The nature and advantages of the invention will be more fully understood from the following description of preferred embodiments shown by way of example in the drawings in which.

Figure 1:
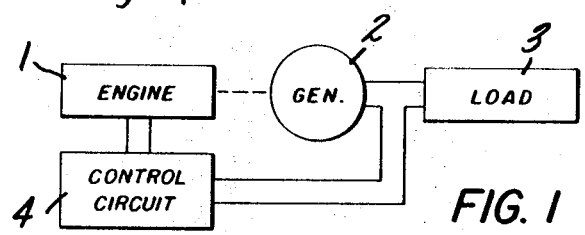
FIG. 1 is a block diagram showing schematically an electric generator, an engine driving the generator, a load on the generator and a control circuit for the engine.

In FIG. 1 there is shown schematically an engine 1 driving an AC generator 2 which supplies current to a load 3. The engine is controlled by a control circuit 4 so as to run at a selected operating speed when there is load on the generator and at a selected idling speed when there is no load.

According to the service for which it is intended, the alternating current generator 2 may be a single-phase generator with a two-wire on three-wire output or it may be multiphase, for example, three-phase either star or delta connected. The generator is selected to provide the desired voltage or voltages and the desired frequency when running at a selected operating speed and may have either a rotating or stationary field. Alternating current produced by the generator may, if desired, be rectified to provide direct current.

The load 3 may comprise a variety of devices requiring electric power. For example, the load may comprise electric lights, electric tools and various electric appliances. The various load components are provided with suitable switches or disconnect devices so that the several load components can be turned on and off individually or collectively as desired. The amount of load on the generator can be varied according to the number of load components that are turned on. If all of the load components are turned off, there is no load on the generator.

The engine 1 is an internal combustion engine provided with suitable fuel regulating means for controlling the speed of the engine. The fuel regulating means may, for example, comprise a fuel injection system or a carburetor provided with a suitable throttle valve. The engine is suitably coupled with the generator, for example, through gears or a drive chain or belting but is preferably direct connected.

The control circuit 4, as will be described more fully below, comprises means for controlling the carburetor or other fuel regulating means of the engine so that the engine runs at a selected operating speed when there is load on the generator regardless of the amount of load and runs at a selected idling speed when there is no load on the generator.

Figure 2:
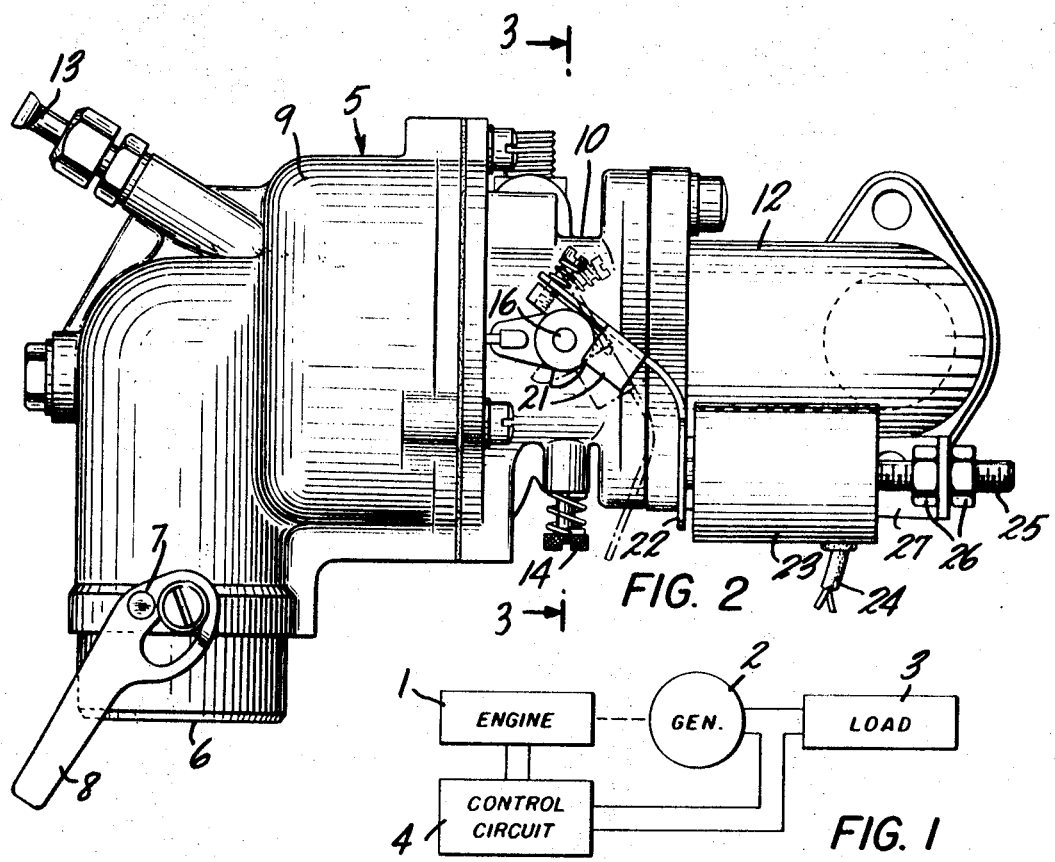
FIG. 2 is a plan of a carburetor for supplying fuel to the internal combustion engine of FIG 1, the carburetor including a throttle valve controlled by a speed responsive governor and by an electromagnetic override device.
Figure 3:
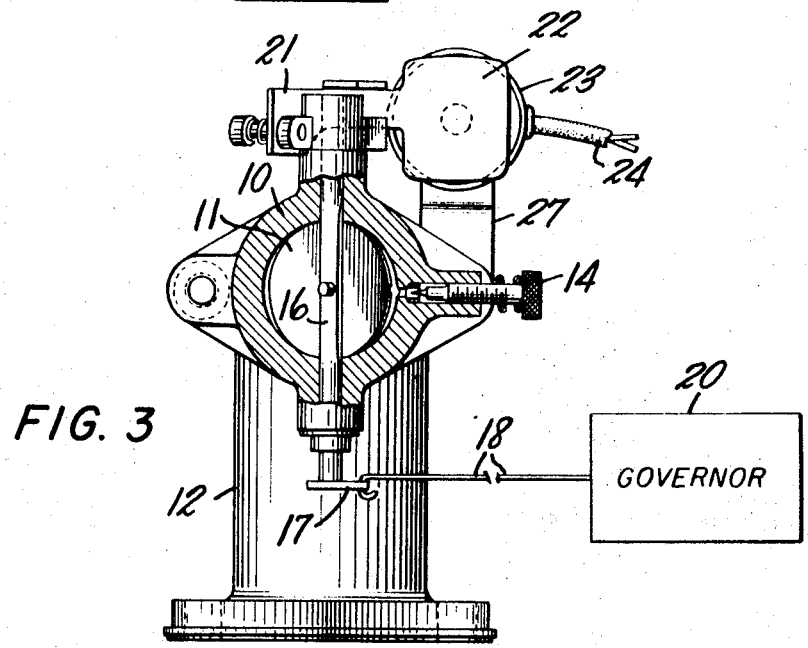
FIG. 3 is a cross section taken approximately on the line 3—3 in FIG. 2 and showing a speed responsive governor schematically.

A suitable carburetor 5 for supplying a controlled fuel-air mixture to the engine is shown by way of example in FIGS. 2 and 3. The carburetor 5 is shown as having an air intake 6 provided with a suitable choke valve 7 controlled by a lever 8, a fuel chamber 9 and a throat 10 provided with a throttle valve 11. The carburetor delivers a controlled fuel-air mixture to the engine through an induction pipe 12 connected to the engine intake. The fuel-air mixture is controlled by an adjustment 13 at normal operating speeds and by an adjustment valve 14 at idling speed.

The throttle valve 11 is shown as a butterfly valve carried by a rotatable shaft 16 which extends diametrically of the throat 10 and projects at opposite sides of the throat. An arm 17 on one end of the throttle valve shaft 16 is connected by suitable linkage 18 to a governor 20. The governor is of any suitable type which is responsive directly or indirectly to the speed of the engine and hence to the speed of the generator. For example, it can be a centrifugal type governor driven by the engine or a pressure-type governor comprising a pump or impeller driven by the engine and producing a fluid pressure proportional to engine speed. Alternatively the governor can be responsive to the voltage or frequency of the generator since the voltage and frequency vary with generator speed and hence with engine speed. The governor acts on the throttle valve 11 through the linkage 18 so as to maintain engine speed constant at a selected operating speed at which the generator produces the desired voltage and the desired frequency. Upon increase of load, the throttle is moved toward a more widely open position while upon decrease of load it is moved toward closed position. The linkage 18 preferably comprises a spring or other resilient linkage component so that the idling control, which will be described below, can override the control of the throttle valve 11 by the governor 20 when there is no load on the generator 2.

On the other end of the throttle valve shaft 16 there is mounted an arm 21 carrying the armature 22 of an iron core electromagnet 23. The electromagnet is provided with leads 24 connecting it in the control circuit which will be described below. When the electromagnet is energized, the armature 22 is attracted to position as shown in solid lines in FIG. 2 in which it engages the core of the magnet. In this position, the throttle valve is held in the position illustrated in FIG. 3 in which it almost closes the throat 10 so that only sufficient fuel is supplied to the engine to operate it at idling speed. The electromagnet 23 is wound so that with even a low voltage applied to the electromagnet it will exert sufficient force on the armature 22 to overcome the control exercised by the governor 20 and hold the throttle valve in position for operation of the engine at idling speed regardless of the action of the governor. When load on the generator is turned off, the throttle is moved toward closed position by the governor so that the armature 22 is brought closer to the electromagnet 23 and can hence be more easily attracted to it upon energization of the electromagnet. Moreover at the instant load is turned off, the generator is still running at operating speed to supply full voltage.

When load is again turned on and the electromagnet 23 is thereby deenergized, the governor resumes control of the throttle valve and moves it in an opening direction to cause the engine to accelerate to and remain at normal operating speed. The electromagnet 23 is shown mounted by means of a threaded rod 25 and nuts 26 on a bracket 27 fixed to the carburetor so as to be adjustable in an axial direction, thereby adjusting the position in which the throttle 11 is held when the electromagnet is energized. This sets the idling speed.

By means of the control circuit 4, the electromagnet 23 is energized when there is no load on the generator 2 and is deenergized when there is a load on the generator. A control circuit in accordance with the present invention is shown by way of example, in FIG. 4, where the generator 2 is represented, as a single-phase alternating current generator supplying power to a generator load 3 which, as indicated above, is variable and intermittent. One terminal of the electromagnet 23 is connected to one of the output terminals of the generator 2 while the other terminal of the electromagnet 23 is connected through a diode 29 and a resistance 30 to the opposite output terminal of the generator. It can thus be seen that the electromagnet 23, diode 29 and resistor 30 are connected in series with one another across the output of the generator.

The primary 31A of a current transformer 31 is connected in series with the generator load 3 across the output terminals of the generator so that the load current flows through the primary of the transformer. The secondary winding 31B of the transformer is connected to the alternating current terminals of a rectifier 32 which is shown as a full-wave bridge-type rectifier but can be a full wave center tap or a half-wave rectifier. The direct current terminals of the rectifier 32 are connected through a current limiting resistor 33 to the gate-cathode circuit of a silicon-controlled rectifier 34. The anode-cathode circuit of the silicon-controlled rectifier 34 is connected across the electromagnet 23 so that when the silicon-controlled rectifier 34 is conducting the electromagnet 23 is short-circuited and hence deenergized since it can conduct in only one direction by reason of the diode 29. When the silicon-controlled rectifier 34 is nonconducting, the electromagnet 23 is energized by current from the generator 2 applied through the resistance 30 and the diode 29. It will be seen that the diode 29 rectifies the current flowing through the electromagnet 23. A capacitor 35 connected in parallel with the electromagnet filters the half-wave voltage supplied by the diode 29 so that the voltage applied to the electromagnet 23 is more nearly a DC voltage than a half-wave voltage. A resistance 36 connected across the gate-cathode circuit of the silicon-controlled rectifier 34 cooperates with the resistance 33 in limiting the control voltage applied to the rectifier 34.

When there is any load on the generator 2 and hence current through the primary winding 31A of the current transformer 31, the output of the secondary winding 31B of the transformer is rectified by the rectifier 32 and applied to the gate-cathode circuit of the silicon-controlled rectifier 34 so as to cause the rectifier 34 to become conducting. The electromagnet 23 is thereby effectively short-circuited and thus deenergized. Control of the engine throttle 11 is thereby left to the governor 20 which controls the throttle opening in accordance with engine speed so as to maintain the engine at a selected operating speed. With the electromagnet 23 short-circuited by the silicon-controlled rectifier 34, full generator voltage is applied across the resistor 30. The resistance value is appropriately selected so as to avoid excessive current through the silicon-controlled rectifier or excessive power loss.

When all of the generator load is turned off so that there is no load on the generator, no current flows through the primary winding of the current transformer 31 and hence no voltage is applied to the gate-cathode circuit of the silicon-controlled rectifier 34. The rectifier 34 returns to a nonconducting state on the first current reversal of the AC generator output so that the electromagnet is no longer short-circuited and hence current flows through the electromagnet 23 to energize it. Upon energizing of the electromagnet 23, the armature 22 is attracted to the solid line position shown in FIG. 2 so as to override the governor 20 and move the throttle 11 to a position for applying only enough fuel to the engine to operate it at a selected idling speed. The override of the governor control is permitted either by inherent "resiliency" in the governor itself or resilience in the connecting linkage 18 which connects the governor with the throttle valve 16. The throttle valve will be held in idling position as long as there is no load on the generator.

If any load on the generator is again turned "ON," current flows through the primary winding 31A of the current transformer 31 whereupon a voltage is applied by the rectifier output of the transformer to the gate-cathode of the silicon-controlled rectifier 34 causing it to become conductive. The electromagnet 23 is thereby short-circuited and deenergized so that control of the throttle valve 11 is resumed by the governor 20 to accelerate the engine to operating speed and maintain it at such speed as long as there is load on the generator.

If instead of being single phase, the generator 2 is two or three phase, supplying a corresponding two- or three-phase load, the primary winding 31A of the current transformer 31 is connected in series with one phase of the generator load so that when there is any load on generator the transformer 31 will be energized so as to cause the silicon-controlled rectifier 34 to become conducting and short circuit the electromagnet 23 in the manner described above. The circuitry is thus applicable to multiphase alternating current generators as well as single phase.

Figure 4:
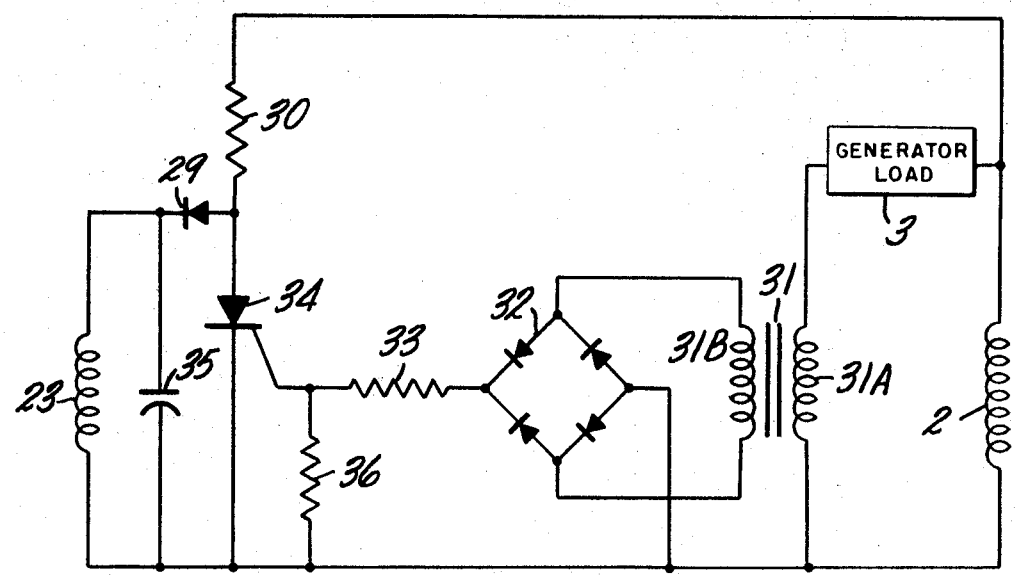
FIG. 4 is a circuit diagram showing circuitry controlling the override device shown in FIGS. 2 and 3 when used with a single phase two wire alternating current generator.
Figure 5:
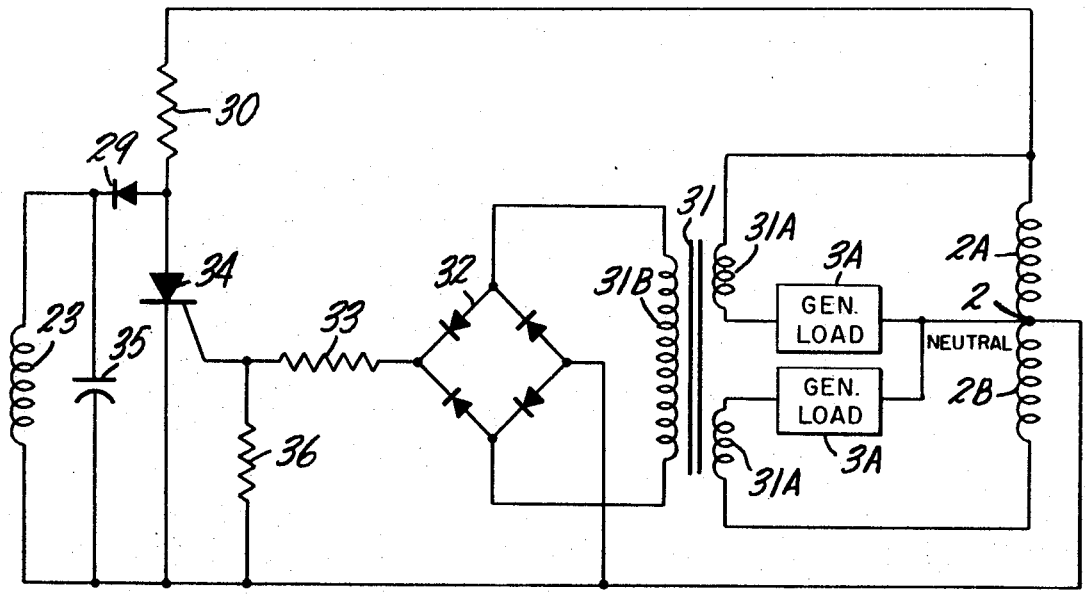
FIG. 5 is a circuit diagram of the control circuit for an override device used with a single-phase alternating current generator having a three-wire output.

In FIG. 5 there is shown a control circuit which is like that of FIG. 4 except that the alternating current generator 2 is shown as a three-wire single-phase generator having two armature windings 2A and 2B supplying current respectively to two generator loads 3A and 3B. The current transformer 31 is provided with two primary windings 31A one of which is connected in series with the generator load 3A and the other connected in series with the generator load 3B. The characteristics of the current transformer 31 are such that any load current in either or both of the primary windings will produce sufficient voltage at the output of the secondary winding 31B to energize the silicon-controlled rectifier 34 and turn it "ON."

The control circuit of FIG. 5 otherwise comprises the same components as that of FIG. 4, the components being designated by the same reference numerals in both figures. Moreover, the circuit shown in FIG. 5 operates in the same manner that has been described with reference to FIG. 4. When there is no load current flowing through either of the primary windings 31A of the current transformer 31, the silicon-controlled rectifier 34 is turned "OFF" so that generator voltage across the center tap and one of the outside taps of the generator is applied to the electromagnet 23 in series with the diode 29 and resistance 30 so as to energize the electromagnet 23 and cause it to override the speed responsive governor 20 so that the engine will run at a selected idling speed. When any generator load is turned "ON," the resulting current flowing through either or both of the primary windings 31A of the current transformer 31 results in a voltage being applied to the gate-cathode circuit of the silicon-controlled rectifier 34 so as to turn it "ON" thereby short-circuiting and thus deenergizing the electromagnet 23 so that control of engine speed is resumed by the speed responsive governor 20.

It will be seen that the control provided in accordance with the present invention is fully automatic so that the engine and hence the generator are operated at a selected operating speed under control of the governor whenever there is any load on the generator and are operated at idling speed whenever the generator is unloaded.

While preferred embodiments of the invention have been illustrated by way of example in the drawings, it will be understood that many modifications can be made and that the invention is in no way limited to the illustrated embodiments.

What we claim is:

1. In combination with an electrical generator having an output, a load circuit connected with said generator output, said load circuit including a variable and intermittent load and an internal combustion engine driving said generator, load responsive means for automatically controlling the speed of said engine comprising fuel regulating means controlling the supply of fuel to said engine, governor means responsive to the speed of said engine and controlling said fuel regulating means to maintain the speed of said engine and generator normally at a selected value, electromagnetically operable means for overriding said governor means to maintain said fuel regulating means in condition to operate said engine at idling speed, and a control circuit comprising a resistor, means connecting said electromagnetically operable means in series with said resistor across the output of said generator, a silicon-controlled rectifier connected in shunt with said electromagnetically operable means, and means responsive respectively to load and no-load conditions of said generator controlling said silicon-controlled rectifier to render said silicon-controlled rectifier conductive to short and thereby deenergize said electromagnetically activated means when there is load on the generator, whereupon said fuel regulating means is controlled by said governor to maintain said engine at said selected speed and to render said silicon-controlled rectifier nonconductive and thereby energize said electromagnetically operable means to override said governor and hold said fuel regulating means in idling condition when there is no load on the generator.

2. A combination according to claim 1, in which a capacitor is connected across said electromagnetically operable overriding means.

3. A combination according to claim 1, in which said generator is an alternating current generator and in which a diode is connected in series with said resistor and said electromagnetically operable overriding means.

4. A combination according to claim 1 in which said generator is an alternating current generator and said means for controlling the conduction of said silicon-controlled rectifier comprises a current transformer having a primary and a secondary, means connecting said primary in series with the generator load, rectifying means having an input and an output, means connecting the input of said rectifying means with the secondary of said transformer and means connecting the output of said rectifying means to said silicon-controlled rectifier to control the conduction of said silicon-controlled rectifier in accordance with current flowing through the primary of said transformer.

5. A combination according to claim 4, in which said generator has two load circuits and said current transformer has two primaries, one connected in series with one said load circuit and another connected in series with another said load circuit.

6. In combination with an alternating current generator having an output, a load circuit connected with said generator output, said load circuit including a variable and intermittent load, and an internal combustion engine driving said generator, means for automatically controlling the speed of said engine comprising fuel regulating means controlling the supply of fuel to said engine, governor means responsive to the speed of said engine and controlling said fuel regulating means to maintain the speed of said engine normally at a selected operating value, electromagnetic means for overriding said governor means to maintain said fuel regulating means in condition to operate said engine at idling speed, and a control circuit comprising a resistor and a rectifier, means connecting said electromagnetic means in series with said resistor and rectifier across the output of said generator, a current transformer having a primary and a secondary, means connecting said primary in series with said load, rectifying means having an input and an output, means connecting the input of said rectifying means with the secondary of said transformer, switching means connected in shunt with said electromagnetic means, and means connecting said switching means with the output of said rectifying means to actuate said switching means to short circuit and thereby deenergize said electromagnetic means when there is load on the generator, whereupon said fuel regulating means is controlled by said governor to maintain said engine at said selected speed, and to deactivate said switching means and thereby energize said electromagnetic means to override said governor and hold said fuel regulating means in idling condition when there is no load on the generator.

7. A combination according to claim 6, in which said generator has two load circuits and said current transformer has two primaries, one connected in series with one said load circuit and another connected in series with another said load circuit.

8. A combination according to claim 6, in which said switching means comprises a silicon-controlled rectifier.